(12) United States Patent
Goleski et al.

(10) Patent No.: US 8,920,280 B1
(45) Date of Patent: Dec. 30, 2014

(54) MULTI-SPEED TRANSMISSION

(71) Applicant: Ford Global Technologies, LLC, Dearborn, MI (US)

(72) Inventors: Gregory Daniel Goleski, Rochester Hills, MI (US); Steven Gerald Thomas, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/917,026

(22) Filed: Jun. 13, 2013

(51) Int. Cl.
 *F16H 3/62* (2006.01)

(52) U.S. Cl.
 CPC .......................................... *F16H 3/62* (2013.01)
 USPC .......................................................... 475/277

(58) Field of Classification Search
 None
 See application file for complete search history.

(56) References Cited

U.S. PATENT DOCUMENTS

| | | | |
|---|---|---|---|
| 2,890,603 A * | 6/1959 | Miller et al. | 475/134 |
| 4,624,154 A * | 11/1986 | Kraft et al. | 475/66 |
| 6,960,149 B2 | 11/2005 | Ziemer | |
| 6,984,187 B2 * | 1/2006 | Biermann | 475/275 |
| 8,047,945 B2 * | 11/2011 | Wittkopp et al. | 475/219 |
| 8,210,981 B2 | 7/2012 | Bauknecht et al. | |
| 8,231,495 B2 | 7/2012 | Gumpoltsberger et al. | |
| 8,251,857 B1 * | 8/2012 | Mellet et al. | 475/280 |
| 8,303,455 B2 | 11/2012 | Gumpoltsberger et al. | |
| 8,376,890 B2 * | 2/2013 | Hwang | 475/219 |
| 8,388,488 B2 * | 3/2013 | Phillips et al. | 475/280 |
| 8,721,488 B2 * | 5/2014 | Mellet et al. | 475/276 |
| 8,764,603 B1 * | 7/2014 | Noh et al. | 475/288 |
| 2010/0062893 A1 * | 3/2010 | Antonov | 475/275 |

OTHER PUBLICATIONS

H. Benford, M. Leising, The Lever Analogy: A New Tool in Transmission Analysis, 1982, Society of Automotive Engineers, Inc. 810102, p. 429-437.

* cited by examiner

*Primary Examiner* — Dirk Wright
(74) *Attorney, Agent, or Firm* — James Dottavio; Brooks Kushman P.C.

(57) ABSTRACT

A transmission gearing arrangement produces nine forward speed ratios and one reverse speed ratio by selective engagement of three shift elements in various combinations. Two planetary gear sets are configured to rotate about an input axis while two planetary gear sets are configured to rotate about a second axis. Power is transferred from the input axis to the second axis by two pairs of axis transfer gears. The output element is located on the second axis.

23 Claims, 3 Drawing Sheets

MULTI-SPEED TRANSMISSION

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

DETAILED DESCRIPTION

Figure 1:
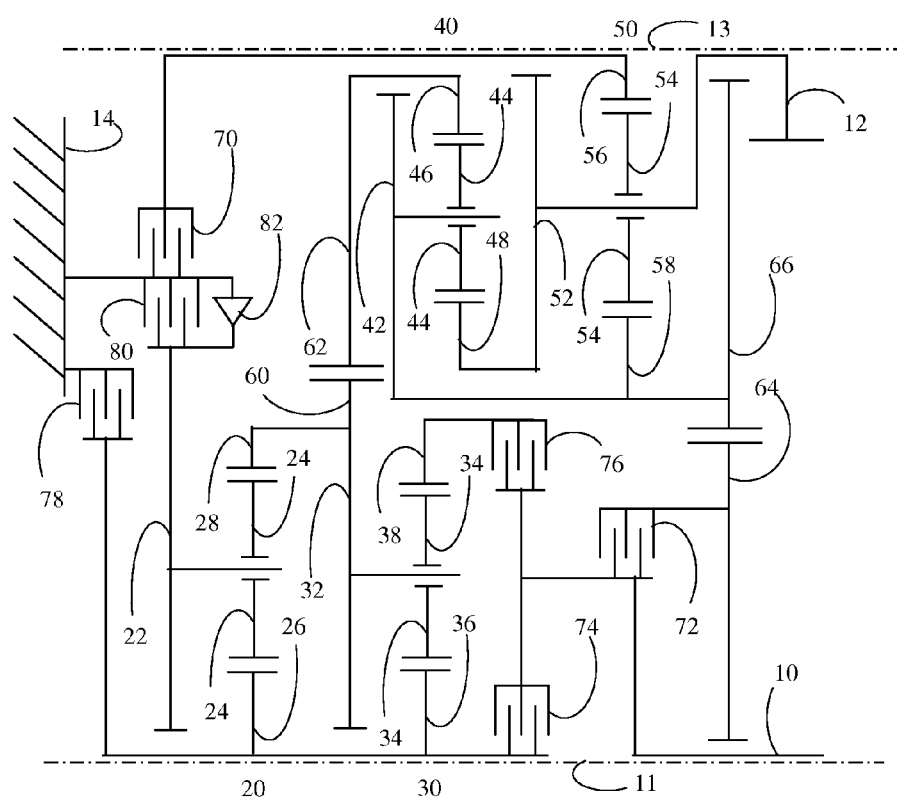
FIG. 1 is a schematic diagram of a first transmission gearing arrangement.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. The speed of an element is positive when the element rotates in one direction and negative when the element rotates in the opposite direction. A discrete ratio transmission has a gearing arrangement that selectively imposes a variety of speed ratios between an input and an output.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Two rotating elements are coupled if they are either fixedly coupled or selectively coupled.

FIG. 1 depicts a transaxle that provides a variety of speed ratios between input 10 and output 12. Input 10 may be driven by an internal combustion engine or other prime mover. A launch device such as torque converter or launch clutch may be employed between the prime mover and transaxle input 10 permitting the engine to idle while the vehicle is stationary and a transaxle ratio is selected. Output 12 may be a gear that transmits power to a differential axis through an additional gear mesh.

The transaxle of FIG. 1 utilizes four simple planetary gear sets 20, 30, 40, and 50. A planet carrier 22 rotates about the input shaft axis 11 and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. Gear sets 30, 40, and 50 are similarly structured. The planet carriers, sun gears, and ring gears of gear sets 40 and 50, however, rotate about a second axis 13.

A simple planetary gear set is a type of gearing arrangement that imposes a fixed linear speed relationship among the sun gear, the planet carrier, and the ring gear. Other known types of gearing arrangements also impose a fixed linear speed relationship among three rotating elements. For example, a double pinion planetary gear set imposes a fixed linear speed relationship between the sun gear, the ring gear, and the planet carrier.

The transmission of FIG. 1 also utilizes two pairs of axis transfer gears. Gear 60 rotates about the input axis and meshes with gear 62 which rotates about the second axis. Similarly, gear 64 rotates about the input axis and meshes with gear 66 which rotates about the second axis. Meshing axis transfer gears rotate in opposite directions about their respective axes at a fixed speed ratio that is dictated by the relative number of gear teeth. Other types of gearing arrangements impose a fixed speed ratio between elements that rotate about different axis. For example, sprockets engaging a common chain impose a fixed speed ratio although the sprockets rotate in the same direction as one another.

A suggested ratio of gear teeth for each planetary gear set and axis transfer gear pair is listed in Table 1.

TABLE 1

| Ring 28/Sun 26 | 1.80 |
|---|---|
| Ring 38/Sun 36 | 2.13 |
| Ring 48/Sun 46 | 1.88 |
| Ring 58/Sun 56 | 2.88 |
| Gear 62/Gear 60 | 1.00 |
| Gear 66/Gear 64 | 1.00 |

Sun gear 26 is fixedly coupled to sun gear 36. Ring gear 28, carrier 32, and axis transfer gear 60 are mutually fixedly coupled. Carrier 42, ring gear 58, and axis transfer gear 66 are mutually fixedly coupled. Ring gear 48, carrier 52, and output 12 are mutually fixedly coupled. Sun gear 56 is selectively held against rotation by brake 70. Input 10 is selectively coupled to axis transfer gear 64 by clutch 72 and selectively coupled to ring gear 38 by clutch 76. The combination of sun gear 26 and sun gear 36 is selectively coupled to input 10 by clutch 74 and selectively held against rotation by brake 78. Carrier 22 is selectively held against rotation by brake 80. Optional one-way-brake 82 passively precludes carrier 22 from rotating in a negative direction while permitting rotation in the positive direction.

Various combinations of gear sets, clutches, and brakes selectively impose particular speed relationships. The combination of gear sets 40 and 50 impose a linear speed relationship among sun gear 46, the combination of carrier 42 and ring gear 58, the combination of ring 48 and carrier 52, and sun gear 56. The combination of gear set 50 and brake 70 selectively constrain ring gear 58 to rotate faster than carrier 52 and in the same direction whenever brake 70 is engaged. The combination of gear 64, gear 66, and clutch 72 selectively imposes a fixed speed ratio between input 10 and gear 66. The combination of gear sets 20 and 30, clutches 74 and 76, and brakes 78 and 80 selectively impose a plurality of speed ratios between ring gear 28 and input 10. Specifically, engaging clutch 74 and brake 80 constrains ring gear 28 to rotate in the opposite direction of input shaft 10 at a fixed speed ratio. Engaging brakes 78 and 80 holds ring gear 28 against rotation making the speed ratio relative to input 10 equal to zero. Engaging clutch 76 in combination with either brake 78 or brake 80 constrains ring gear 28 to rotate slower than input shaft 10 and in the same direction. Engaging clutches 74 and 76 constrains ring gear 28 to rotate in unison with input 10 making the speed ratio equal to one.

As shown in Table 2, engaging the shift elements in combinations of three establishes nine forward speed ratios and one reverse speed ratio between input 10 and output 12. An X indicates that the shift element is required to establish the speed ratio. An (X) indicates the clutch can be applied but is not required. In 4th gear, clutches 70 and 72 establish the power flow path between input 10 and output 12. Any one of the remaining shift elements can also be applied. Applying clutch 76 ensures that all single and two step shifts from 4th gear can be accomplished by engaging only one shift element and releasing only one shift element. When the gear sets have tooth numbers as indicated in Table 1, the speed ratios have the values indicated in Table 2.

TABLE 2

| | 70 | 72 | 74 | 76 | 78 | 80/82 | Ratio | Step |
|---|---|---|---|---|---|---|---|---|
| Rev | X | | X | | | X | 3.60 | 78% |
| $1^{st}$ | X | | | X | | X | -4.64 | |
| $2^{nd}$ | X | | | X | X | | -2.94 | 1.58 |
| $3^{rd}$ | X | | X | X | | | -2.00 | 1.47 |
| $4^{th}$ | X | X | | (X) | | | -1.35 | 1.48 |
| $5^{th}$ | | X | X | X | | | -1.00 | 1.35 |
| $6^{th}$ | | X | | X | X | | -0.85 | 1.17 |
| $7^{th}$ | | X | | X | | X | -0.77 | 1.11 |
| $8^{th}$ | | X | | | X | X | -0.65 | 1.18 |
| $9^{th}$ | | X | X | | | X | -0.55 | 1.19 |

Figure 2:
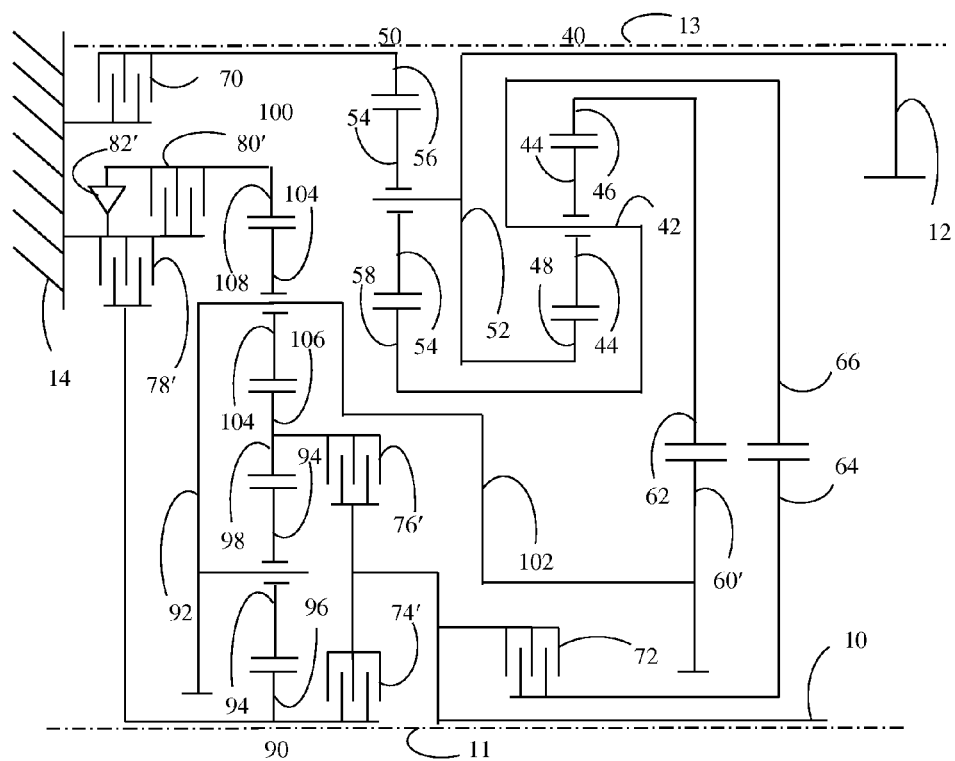
FIG. 2 is a schematic diagram of a second transmission gearing arrangement.

A second example transaxle is illustrated in FIG. 2. The sun gears, carriers, and ring gears of gear sets 90 and 100 rotate about the input axis 11 while the sun gears, carriers, and ring gears of gear sets 40 and 50 rotate about a second axis 13. Ring gear 98 is fixedly coupled to sun gear 106. Carrier 92, carrier 102, and axis transfer gear 60' are mutually fixedly coupled. Carrier 42, ring gear 58, and axis transfer gear 66 are mutually fixedly coupled. Ring gear 48, carrier 52, and output 12 are mutually fixedly coupled. To save axial space, gear set 100 is located radially outside gear set 90. Sun gear 56 is selectively held against rotation by brake 70. Input 10 is selectively coupled to axis transfer gear 64 by clutch 72 and selectively coupled to the combination of ring gear 98 and sun gear 106 by clutch 76'. Sun gear 96 and sun gear 36 is selectively coupled to input 10 by clutch 74' and selectively held against rotation by brake 78'. Ring gear 108 is selectively held against rotation by brake 80'. Optional one-way-brake 82' passively precludes ring gear 108 from rotating in a negative direction while permitting rotation in the positive direction. A suggested ratio of gear teeth for each planetary gear set and axis transfer gear pair is listed in Table 3.

TABLE 3

| Ring 98/Sun 96 | 1.90 |
|---|---|
| Ring 108/Sun 106 | 1.45 |
| Ring 48/Sun 46 | 1.90 |
| Ring 58/Sun 56 | 3.00 |
| Gear 62/Gear 60' | 1.00 |
| Gear 66/Gear 64 | 1.00 |

Various combinations of gear sets, clutches, and brakes selectively impose particular speed relationships. The combination of gear sets 40 and 50 impose a linear speed relationship among sun gear 46, the combination of carrier 42 and ring gear 58, the combination of ring 48 and carrier 52, and sun gear 56. The combination of gear set 50 and brake 70 selectively constrain ring gear 58 to rotate faster than carrier 52 and in the same direction whenever brake 70 is engaged. The combination of gear 64, gear 66, and clutch 72 selectively imposes a fixed speed ratio between input 10 and gear 66. Finally, the combination of gear sets 90 and 100, clutches 74' and 76', and brakes 78' and 80' selectively impose a plurality of speed ratios between carrier 102 and input 10.

As shown in Table 4, engaging the shift elements in combinations of three establishes nine forward speed ratios and one reverse speed ratio between input 10 and output 12. When the gear sets have tooth numbers as indicated in Table 3, the speed ratios have the values indicated in Table 4.

TABLE 4

|  | 70 | 72 | 74' | 76' | 78' | 80'/82' | Ratio | Step |
|---|---|---|---|---|---|---|---|---|
| Rev | X |  | X |  |  | X | 3.45 | 72% |
| 1st | X |  |  | X |  | X | -4.82 |  |
| 2nd | X |  |  | X | X |  | -3.00 | 1.61 |
| 3rd | X |  | X | X |  |  | -1.97 | 1.53 |
| 4th | X | X |  | (X) |  |  | -1.33 | 1.48 |
| 5th |  | X | X | X |  |  | -1.00 | 1.33 |
| 6th |  | X |  | X | X |  | -0.85 | 1.18 |
| 7th |  | X |  | X |  | X | -0.76 | 1.11 |
| 8th |  | X |  |  | X | X | -0.66 | 1.16 |
| 9th |  | X | X |  |  | X | -0.55 | 1.20 |

Figure 3:
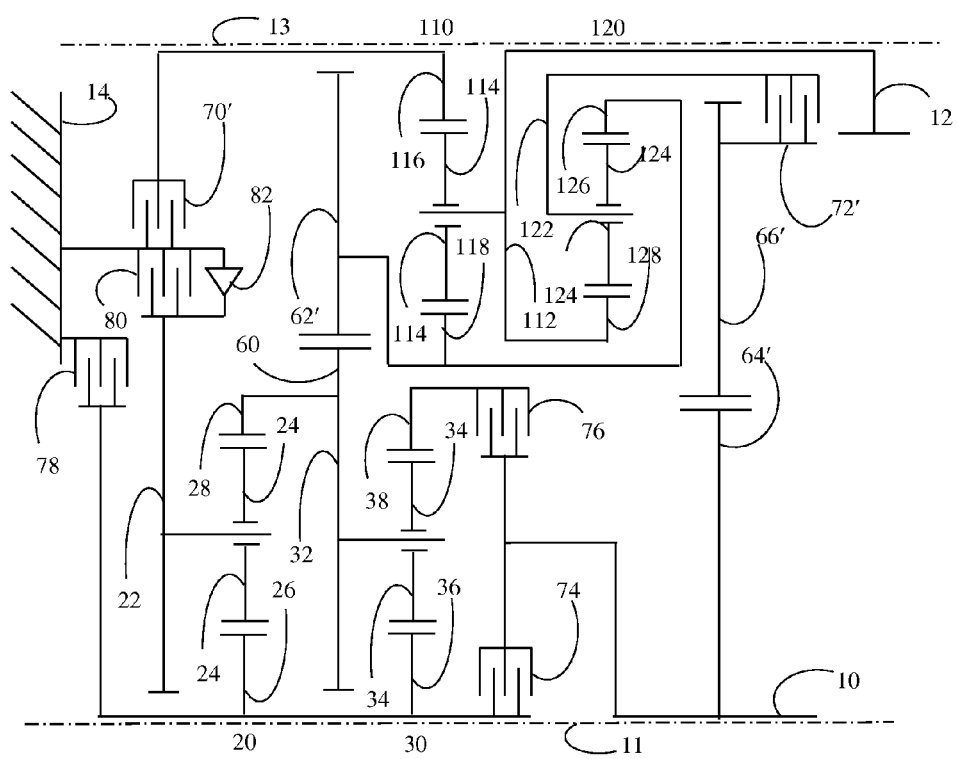
FIG. 3 is a schematic diagram of a third transmission gearing arrangement.

A third example transaxle is illustrated in FIG. 3. The sun gears, carriers, and ring gears of gear sets 20 and 30 rotate about the input axis 11 while the sun gears, carriers, and ring gears of gear sets 110 and 120 rotate about a second axis 13. Sun gear 26 is fixedly coupled to sun gear 36. Ring gear 28, carrier 32, and axis transfer gear 60 are mutually fixedly coupled. Input 10 and axis transfer gear 64' are fixedly coupled. Sun gear 126, ring gear 118, and axis transfer gear 62' are mutually fixedly coupled. Ring gear 128, carrier 112, and output 12 are mutually fixedly coupled. Sun gear 116 is selectively held against rotation by brake 70'. Axis transfer gear 66' is selectively coupled to carrier 122 by clutch 72'. Input 10 is selectively coupled to ring gear 38 by clutch 76. The combination of sun gear 26 and sun gear 36 is selectively coupled to input 10 by clutch 74 and selectively held against rotation by brake 78. Carrier 22 is selectively held against rotation by brake 80. Optional one-way-brake 82 passively precludes carrier 22 from rotating in a negative direction while permitting rotation in the positive direction. A suggested ratio of gear teeth for each planetary gear set and axis transfer gear pair is listed in Table 5.

TABLE 5

| Ring 28/Sun 26 | 1.80 |
|---|---|
| Ring 38/Sun 36 | 2.13 |
| Ring 118/Sun 116 | 1.50 |
| Ring 128/Sun 126 | 2.00 |
| Gear 62'/Gear 60 | 1.00 |
| Gear 66'/Gear 64' | 1.00 |

Various combinations of gear sets, clutches, and brakes selectively impose particular speed relationships. The combination of gear sets 110 and 120 impose a linear speed relationship among the combination of ring gear 118 and sun gear 126, carrier 122, the combination of carrier 112 and ring gear 128, and sun gear 116. The combination of gear set 110 and brake 70' selectively constrain ring gear 118 to rotate faster than carrier 112 and in the same direction whenever brake 70' is engaged. The combination of gear set 120 and clutch 72' selectively imposes a linear speed relationship among sun gear 126, axis transfer gear 66', and ring gear 128. Finally, the combination of gear sets 20 and 30, clutches 74 and 76, and brakes 78 and 80 selectively impose a plurality of speed ratios between ring gear 28 and input 10.

As shown in Table 6, engaging the shift elements in combinations of three establishes nine forward speed ratios and one reverse speed ratio between input 10 and output 12. When the gear sets have tooth numbers as indicated in Table 5, the speed ratios have the values indicated in Table 6.

TABLE 6

|  | 70' | 72' | 74 | 76 | 78 | 80/82 | Ratio | Step |
|---|---|---|---|---|---|---|---|---|
| Rev | X |  | X |  |  | X | 3.00 | 78% |
| 1st | X |  |  | X |  | X | -3.86 |  |
| 2nd | X |  |  | X | X |  | -2.45 | 1.58 |
| 3rd | X |  | X | X |  |  | -1.67 | 1.47 |
| 4th | X | X |  | (X) |  |  | -1.22 | 1.36 |
| 5th |  | X | X | X |  |  | -1.00 | 1.22 |
| 6th |  | X |  | X | X |  | -0.86 | 1.16 |
| 7th |  | X |  | X |  | X | -0.80 | 1.11 |
| 8th |  | X |  |  | X | X | -0.67 | 1.17 |
| 9th |  | X | X |  |  | X | -0.56 | 1.19 |

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   an input shaft supported for rotation about a first axis;
   an output shaft supported for rotation about a second axis, the second axis parallel to the first axis;
   first, second, and third shafts supported for rotation about the second axis;
   a first gearing arrangement configured to fixedly impose a linear speed relationship among the first shaft, the second shaft, the output shaft, and the third shaft;
   a second gearing arrangement configured to selectively impose a first fixed speed ratio between the second shaft and the input shaft;
   a third gearing arrangement configured to selectively impose a plurality of fixed speed ratios between the first shaft and the input shaft; and
   a first brake configured to selectively hold the third shaft against rotation.

2. The transmission of claim 1 wherein the first gearing arrangement comprises:
   a first simple planetary gear set having a first sun gear fixedly coupled to the first shaft, a first ring gear fixedly coupled to the output shaft, a first planet carrier fixedly coupled to the second shaft, and at least one planet gear supported for rotation on the first planet carrier and in continuous meshing engagement with the first sun gear and the first ring gear; and
   a second simple planetary gear set having a second sun gear fixedly coupled to the third shaft, a second ring gear fixedly coupled to the second shaft, a second planet carrier fixedly coupled to the output shaft, and at least one planet gear supported for rotation on the second planet carrier and in continuous meshing engagement with the second sun gear and the second ring gear.

3. The transmission of claim 1 wherein the first gearing arrangement comprises:
a first simple planetary gear set having a first sun gear fixedly coupled to the third shaft, a first ring gear fixedly coupled to the first shaft, a first planet carrier fixedly coupled to the output shaft, and at least one planet gear supported for rotation on the first planet carrier and in continuous meshing engagement with the first sun gear and the first ring gear; and
a second simple planetary gear set having a second sun gear fixedly coupled to the first shaft, a second ring gear fixedly coupled to the output shaft, a second planet carrier fixedly coupled to the second shaft, and at least one planet gear supported for rotation on the second planet carrier and in continuous meshing engagement with the second sun gear and the second ring gear.

4. The transmission of claim 1 wherein the second gearing arrangement comprises:
a first axis transfer gear supported for rotation about the first axis;
a second axis transfer gear fixedly coupled to the second shaft and in continuous meshing engagement with the first axis transfer gear; and
a first clutch configured to selectively couple the first axis transfer gear to the input shaft.

5. The transmission of claim 1 wherein the second gearing arrangement comprises:
a first axis transfer gear fixedly coupled to the input shaft;
a second axis transfer gear supported for rotation about the second axis and in continuous meshing engagement with the first axis transfer gear; and
a first clutch configured to selectively couple the second axis transfer gear to the second shaft.

6. The transmission of claim 1 wherein the plurality of fixed speed ratios comprises:
a second fixed speed ratio having an opposite sign from the first fixed speed ratio;
a third fixed speed ratio equal to zero;
a fourth fixed speed ratio having a same sign as the first fixed speed ratio; and
fifth and sixth fixed speed ratios having the same sign as the first fixed speed ratio and greater magnitude than the fourth fixed speed ratio.

7. The transmission of claim 6 wherein the third gearing arrangement comprises a third shift element, the third gearing arrangement configured such that the third shift element is engaged to impose the second, third, and fourth fixed speed ratios and is not engaged to impose the fifth and sixth fixed speed ratios.

8. The transmission of claim 7 wherein the third shift element comprises a passive one-way clutch.

9. The transmission of claim 1 wherein the third gearing arrangement comprises:
fourth, fifth, sixth, and seventh shafts supported for rotation about the first axis;
a fourth gearing arrangement configured to fixedly impose a linear speed relationship among the fourth shaft, the fifth shaft, the sixth shaft, and the seventh shaft;
a fifth gearing arrangement configured to fixedly impose a seventh fixed speed ratio between the first shaft and the sixth shaft;
a second brake configured to selectively hold the fourth shaft against rotation;
a third brake configured to selectively hold the fifth shaft against rotation;
a second clutch configured to selectively couple the fourth shaft to the input shaft; and
a third clutch configured to selectively couple the seventh shaft to the input shaft.

10. The transmission of claim 9 wherein the fourth gearing arrangement comprises:
a third simple planetary gear set having a third sun gear fixedly coupled to the fourth shaft, a third ring gear fixedly coupled to the sixth shaft, a third planet carrier fixedly coupled to the fifth shaft, and at least one planet gear supported for rotation on the third planet carrier and in continuous meshing engagement with the third sun gear and the third ring gear; and
a fourth simple planetary gear set having a fourth sun gear fixedly coupled to the fourth shaft, a fourth ring gear fixedly coupled to the seventh shaft, a fourth planet carrier fixedly coupled to the sixth shaft, and at least one planet gear supported for rotation on the fourth planet carrier and in continuous meshing engagement with the fourth sun gear and the fourth ring gear.

11. The transmission of claim 9 wherein the fourth gearing arrangement comprises:
a third simple planetary gear set having a third sun gear fixedly coupled to the fourth shaft, a third ring gear fixedly coupled to the seventh shaft, a third planet carrier fixedly coupled to the sixth shaft, and at least one planet gear supported for rotation on the third planet carrier and in continuous meshing engagement with the third sun gear and the third ring gear; and
a fourth simple planetary gear set having a fourth sun gear fixedly coupled to the seventh shaft, a fourth ring gear fixedly coupled to the fifth shaft, a fourth planet carrier fixedly coupled to the sixth shaft, and at least one planet gear supported for rotation on the fourth planet carrier and in continuous meshing engagement with the fourth sun gear and the fourth ring gear.

12. The transmission of claim 11 wherein the fourth sun gear is located radially outside the third ring gear.

13. A transmission comprising:
an input shaft supported for rotation about a first axis;
an output shaft supported for rotation about a second axis, the second axis parallel to the first axis;
first and second shafts supported for rotation about the second axis;
a third shaft supported for rotation about the first axis;
a first gearing arrangement configured to fixedly impose a linear speed relationship among the first shaft, the second shaft, and the output shaft;
a second gearing arrangement configured to selectively constrain the second shaft to rotate faster than the output shaft and in a same direction;
a third gearing arrangement configured to selectively impose a first fixed speed ratio between the second shaft and the input shaft;
a fourth gearing arrangement configured to fixedly impose a second fixed speed ratio between the first shaft and the third shaft; and
a fifth gearing arrangement configured to selectively impose a plurality of fixed speed ratios between the third shaft and the input shaft.

14. The transmission of claim 13 wherein the first gearing arrangement comprises:
a first simple planetary gear set having a first sun gear fixedly coupled to the first shaft, a first ring gear fixedly coupled to the output shaft, a first planet carrier fixedly coupled to the second shaft, and at least one planet gear supported for rotation on the first planet carrier and in continuous meshing engagement with the first sun gear and the first ring gear.

15. The transmission of claim 13 wherein the second gearing arrangement comprises:
a second simple planetary gear set having a second sun gear, a second ring gear fixedly coupled to the second shaft, a second planet carrier fixedly coupled to the output shaft, and at least one planet gear supported for rotation on the second planet carrier and in continuous meshing engagement with the second sun gear and the second ring gear; and
a first brake configured to selectively hold the second sun gear against rotation.

16. The transmission of claim 13 wherein the third gearing arrangement comprises:
a first axis transfer gear supported for rotation about the first axis;
a second axis transfer gear fixedly coupled to the second shaft and in continuous meshing engagement with the first axis transfer gear; and
a first clutch configured to selectively couple the first axis transfer gear to the input shaft.

17. The transmission of claim 13 wherein the fourth gearing arrangement comprises:
a third axis transfer gear fixedly coupled to the third shaft; and
a fourth axis transfer gear fixedly coupled to the first shaft and in continuous meshing engagement with the third axis transfer gear.

18. The transmission of claim 13 wherein the plurality of fixed speed ratios comprises a negative ratio, zero, one, and two ratios between zero and one.

19. A transmission comprising:
an input shaft supported for rotation about a first axis;
an output shaft supported for rotation about a second axis, the second axis parallel to the first axis;
a first axis transfer gear fixedly coupled to the input shaft;
a second axis transfer gear supported for rotation about the second axis and in continuous meshing engagement with the first axis transfer gear;
a third axis transfer gears supported for rotation about the first axis;
a fourth axis transfer gear supported for rotation about the second axis and in continuous meshing engagement with the third axis transfer gear;
a first gearing arrangement configured to selectively constrain the fourth axis transfer gear to rotate faster than the output shaft and in a same direction;
a second gearing arrangement configured to selectively impose a linear speed relationship among the fourth axis transfer gear, the second axis transfer gear, and the output shaft; and
a third gearing arrangement configured to selectively impose a plurality of fixed speed ratios between the third axis transfer gear and the input shaft.

20. The transmission of claim 19 wherein the first gearing arrangement comprises:
a first simple planetary gear set having a first sun gear, a first ring gear fixedly coupled to the fourth axis transfer gear, a first planet carrier fixedly coupled to the output shaft, and at least one planet gear supported for rotation on the first planet carrier and in continuous meshing engagement with the first sun gear and the first ring gear; and
a first brake configured to selectively hold the first sun gear against rotation.

21. The transmission of claim 19 wherein the second gearing arrangement comprises:
a second simple planetary gear set having a second sun gear fixedly coupled to the fourth axis transfer gear, a second ring gear fixedly coupled to the output shaft, a second planet carrier, and at least one planet gear supported for rotation on the second planet carrier and in continuous meshing engagement with the second sun gear and the second ring gear; and
a first clutch configured to selectively couple the second carrier to the second axis transfer gear.

22. The transmission of claim 19 wherein the plurality of fixed speed ratios comprises a negative ratio, zero, one, and two ratios between zero and one.

23. The transmission of claim 19 wherein the third gearing arrangement comprises:
first, second, and third shafts supported for rotation about the first axis;
a fourth gearing arrangement configured to fixedly impose a linear speed relationship among the first shaft, the second shaft, the third axis transfer gear, and the third shaft;
a second brake configured to selectively hold the first shaft against rotation;
a third brake configured to selectively hold the second shaft against rotation;
a second clutch configured to selectively couple the first shaft to the input shaft; and
a third clutch configured to selectively couple the third shaft to the input shaft.

* * * * *